(12) United States Patent
Morisawa

(10) Patent No.: US 10,442,552 B2
(45) Date of Patent: Oct. 15, 2019

(54) FLYING DEVICE AND IMAGE-CAPTURING DEVICE

(71) Applicant: SONY CORPORATION, Tokyo (JP)

(72) Inventor: Rui Morisawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 401 days.

(21) Appl. No.: 15/310,021

(22) PCT Filed: Mar. 23, 2015

(86) PCT No.: PCT/JP2015/058694
§ 371 (c)(1),
(2) Date: Nov. 9, 2016

(87) PCT Pub. No.: WO2015/178091
PCT Pub. Date: Nov. 26, 2015

(65) Prior Publication Data
US 2017/0152060 A1   Jun. 1, 2017

(30) Foreign Application Priority Data

May 19, 2014 (JP) ................. 2014-103527

(51) Int. Cl.
| *B64D 47/08* | (2006.01) |
| --- | --- |
| *B64C 27/08* | (2006.01) |
| *B64C 39/02* | (2006.01) |
| *B64D 27/24* | (2006.01) |
| *H04N 5/225* | (2006.01) |
| *G03B 15/00* | (2006.01) |
| *H04N 5/232* | (2006.01) |
| *H04N 7/18* | (2006.01) |

(52) U.S. Cl.
CPC .............. *B64D 47/08* (2013.01); *B64C 27/08* (2013.01); *B64C 39/02* (2013.01); *B64C 39/024* (2013.01); *B64D 27/24* (2013.01); *G03B 15/006* (2013.01); *H04N 5/225* (2013.01); *H04N 5/2252* (2013.01); *H04N 5/2253* (2013.01); *H04N 5/232* (2013.01); *H04N 7/185* (2013.01); *B64C 2201/027* (2013.01); *B64C 2201/042* (2013.01); *B64C 2201/108* (2013.01); *B64C 2201/127* (2013.01)

(58) Field of Classification Search
CPC ........ B64D 47/08; B64D 27/24; B64C 27/08; B64C 39/02; B64C 39/024
See application file for complete search history.

(56) References Cited

U.S. PATENT DOCUMENTS

| 8,322,648 | B2* | 12/2012 | Kroetsch | ............... A63H 27/12 244/17.23 |
| --- | --- | --- | --- | --- |
| 2007/0246601 | A1* | 10/2007 | Layton | ............... B64C 29/0025 244/12.2 |
| 2013/0048792 | A1* | 2/2013 | Szarek | ................. B64C 39/024 244/175 |

FOREIGN PATENT DOCUMENTS

| DE | 29903893 A1 | 9/1999 |
| --- | --- | --- |
| DE | 29903893 U1 | 9/1999 |
| DE | 19906753 A | 9/2000 |

(Continued)

*Primary Examiner* — Justin M Benedik
(74) *Attorney, Agent, or Firm* — Chip Law Group

(57) ABSTRACT

There is provided a flying device that includes a flying mechanism, a frame, and a covering member. The flying mechanism includes a propeller and a drive mechanism that rotatably drives the propeller. The frame surrounds the flying mechanism and supports the covering member. The covering member covers at least an upper face side of the propeller and a lower face side of the propeller.

19 Claims, 13 Drawing Sheets

(56) References Cited

FOREIGN PATENT DOCUMENTS

| | | | |
|---|---|---|---|
| JP | 2006-027448 A | | 2/2006 |
| KR | 20110122469 A | | 11/2011 |
| KR | 20120136797 | * | 12/2012 |
| KR | 20120136797 A | | 12/2012 |
| WO | 2006/112578 A1 | | 10/2006 |
| WO | WO 2006-112578 A1 | | 10/2006 |
| WO | WO2006112578 | * | 10/2006 |
| WO | 2014/055899 A1 | | 4/2014 |
| WO | 2014-055899 A1 | | 4/2014 |

* cited by examiner

FLYING DEVICE AND IMAGE-CAPTURING DEVICE

CROSS REFERENCE TO RELATED APPLICATIONS

This application is a U.S. National Phase of International Patent Application No. PCT/JP2015/058694 filed on Mar. 23, 2015, which claims priority benefit of Japanese Patent Application No. JP 2014-103527 filed in the Japan Patent Office on May 19, 2014. Each of the above-referenced applications is hereby incorporated herein by reference in its entirety.

TECHNICAL FIELD

The present disclosure relates to a flying device and an image-capturing device.

BACKGROUND ART

Technology relating to an image capturing method of photograph in which a camera is attached to a wirelessly controllable flying device and an image is captured with the camera is disclosed (for example, Patent Literature 1). Attaching a camera to the flying device makes it possible to take a picture from the sky and from a place where a tripod is unable to be set. Moreover, attaching a camera to the flying device to perform image-capturing provides a variety of advantages such that its cost can be suppressed more than in the case of using a real airplane or helicopter, image-capturing can be performed safely, image-capturing can be performed even at a low altitude or narrow place, and image-capturing can be performed close to a target, etc.

CITATION LIST

Patent Literature

Patent Literature 1: JP2006-27448A

SUMMARY OF INVENTION

Technical Problem

The flying devices including such an image-capturing device were often used for military in the old days, but recently flying devices for consumers also have been increasing. That is, it is considered that opportunities for users to use the flying devices in hobbies, events, or the like, increase as with normal cameras. On this occasion, safety may be required for the flying devices in consideration of the influence on users using the flying devices and surroundings in flight.

Solution to Problem

According to the present disclosure, there is provided a flying device including a flying mechanism, and a covering member which is supported by a frame surrounding the flying mechanism and covers at least a portion of the flying mechanism.

According to the present disclosure, there is provided an image-capturing device including a flying mechanism, a covering member which is supported by a frame surrounding the flying mechanism and covers at least a portion of the flying mechanism, and an image-capturing part to capture an image of a subject.

According to the present disclosure, the flying mechanism for flying the flying device is covered with the covering member not to be exposed to the outside. Hence, the flying mechanism is unlikely to be directly touched by a user, and can be prevented from being hit by foreign materials in flight.

Advantageous Effects of Invention

As described above, according to the present disclosure, safety of the flying device can be enhanced. Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Note that, the description will be made in the following order.

1. Outline of the flying device
2. Configuration of the flying device
2.1. External configuration
2.2. Internal configuration
3. Conclusion

1. Outline of the Flying Device

Figure 1:
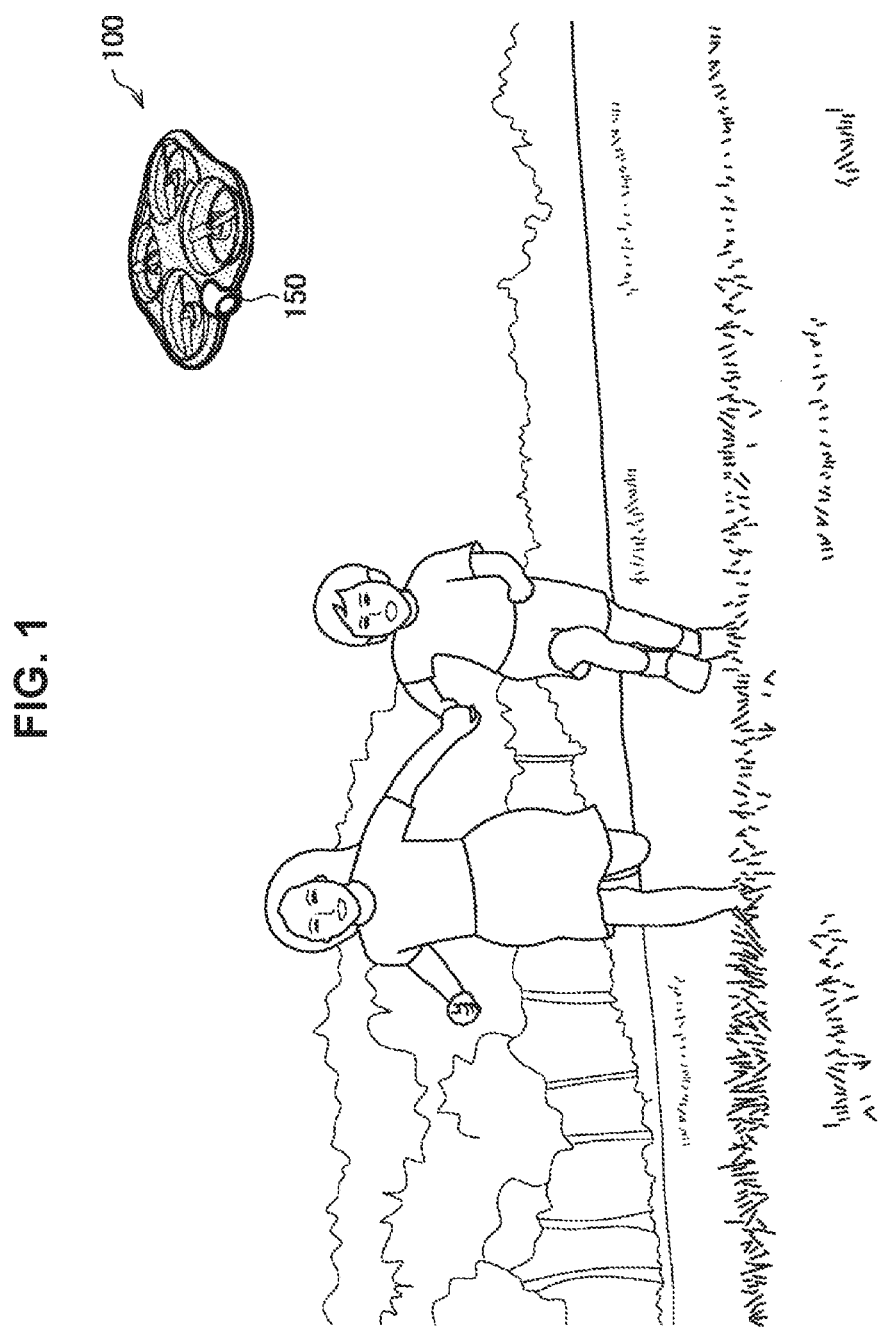
FIG. 1 is an explanatory diagram showing a usage example of a flying device according to an embodiment of the present disclosure.

First, with reference to FIG. 1, an outline of a flying device 100 according to an embodiment of the present disclosure will be described. Note that, FIG. 1 is an explanatory diagram showing a usage example of the flying device 100 according to the present embodiment.

The flying device 100 according to the present embodiment is a flying device that flies based on a user's remote operation or a preset flying route. The flying device 100 according to the present embodiment includes, for example, an image-capturing part 150 and can perform shooting with the image-capturing part 150 while flying. Using such a flying device 100, for example, as shown in FIG. 1, makes it possible to take photographs of children who are running around in the park from above or side while following their movement.

In such a manner, the flying device 100 can be easily used by a user in the daily pleasures, events or the like. The configuration of the flying device 100 will be described in detail below.

2. Configuration of the Flying Device

[2.1. External Configuration]

Figure 2:
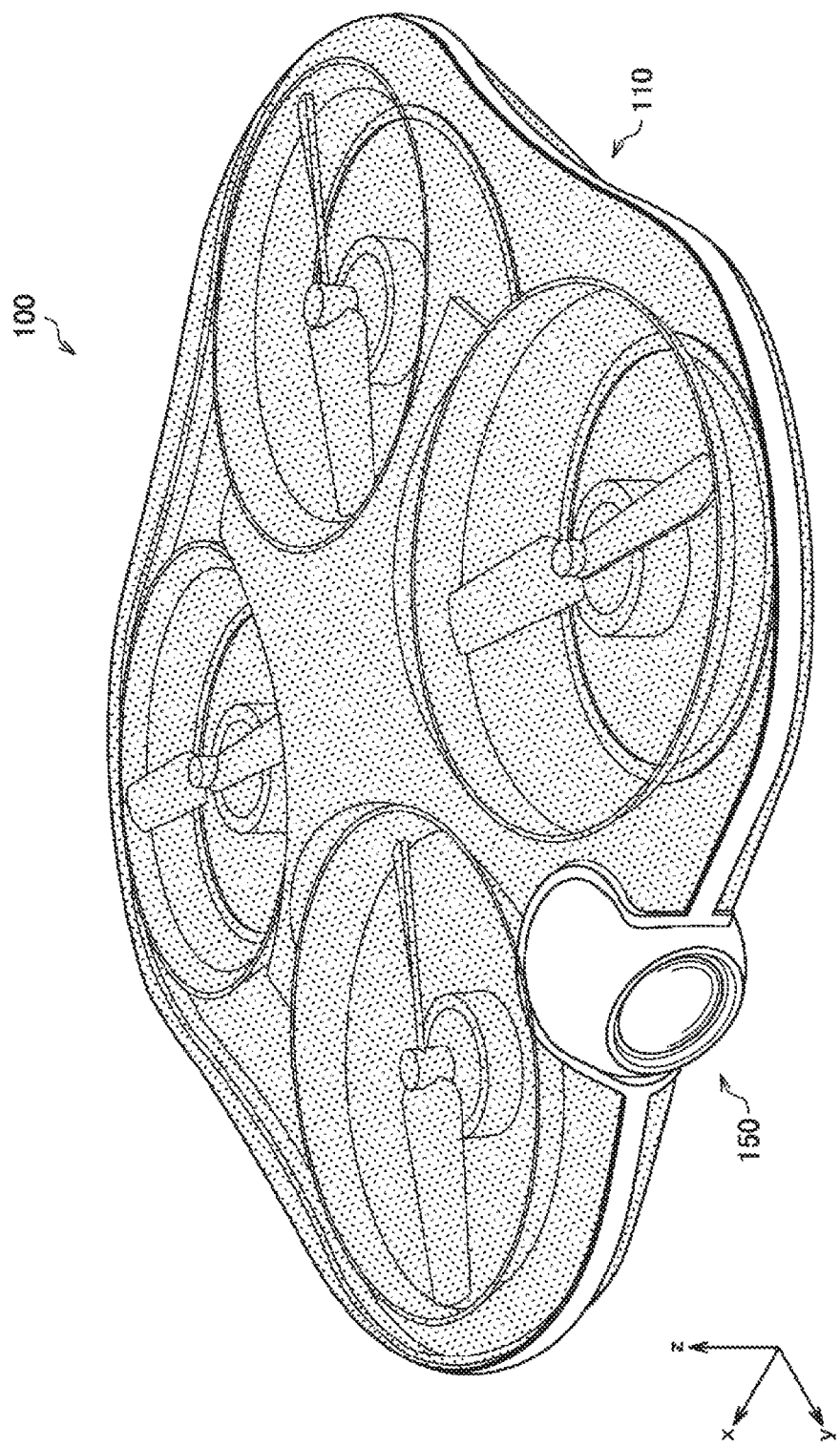
FIG. 2 is a perspective view of the flying device according to the embodiment.
Figure 3:
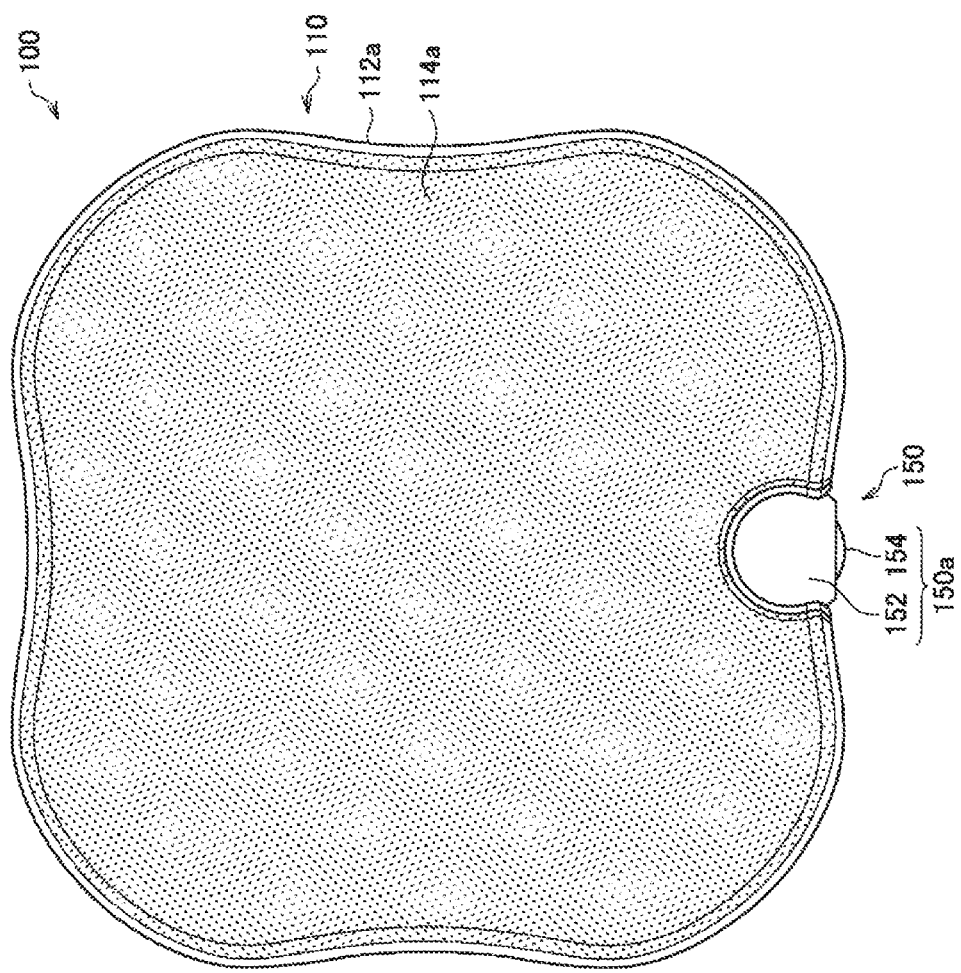
FIG. 3 is a plan view of the flying device according to the embodiment.
Figure 4:
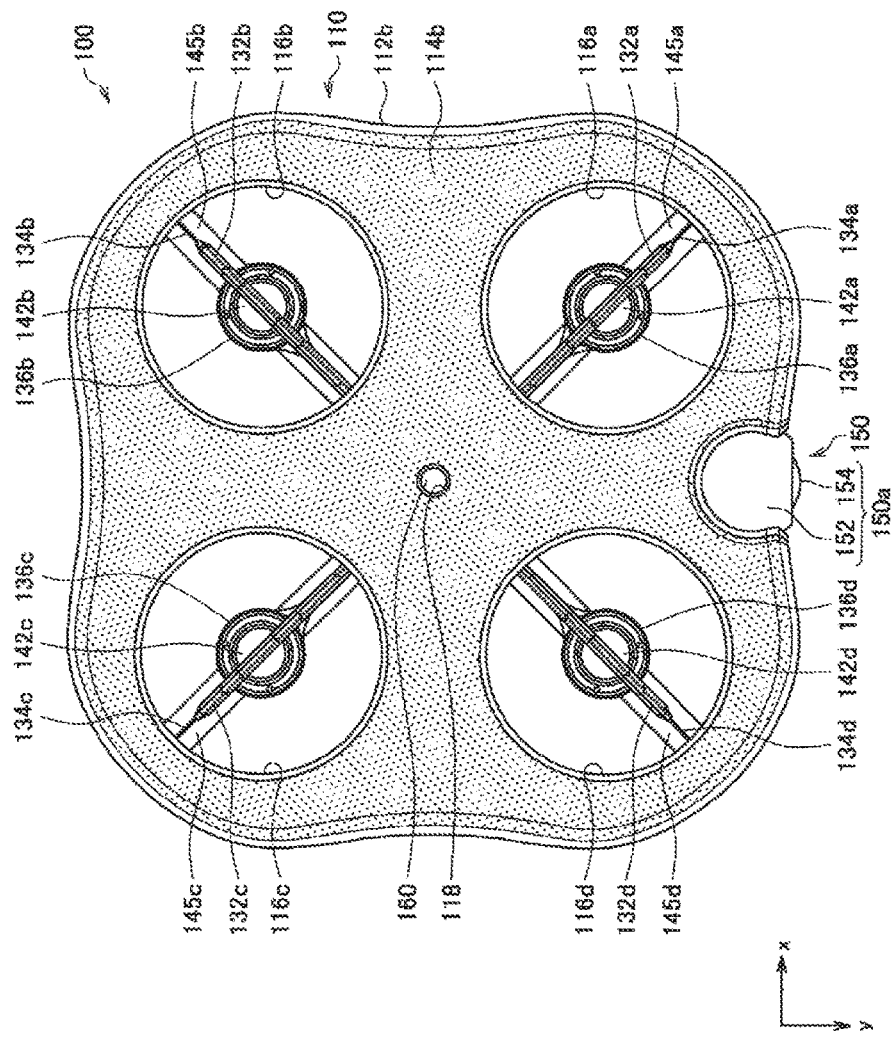
FIG. 4 is a bottom view of the flying device according to the embodiment.
Figure 5:
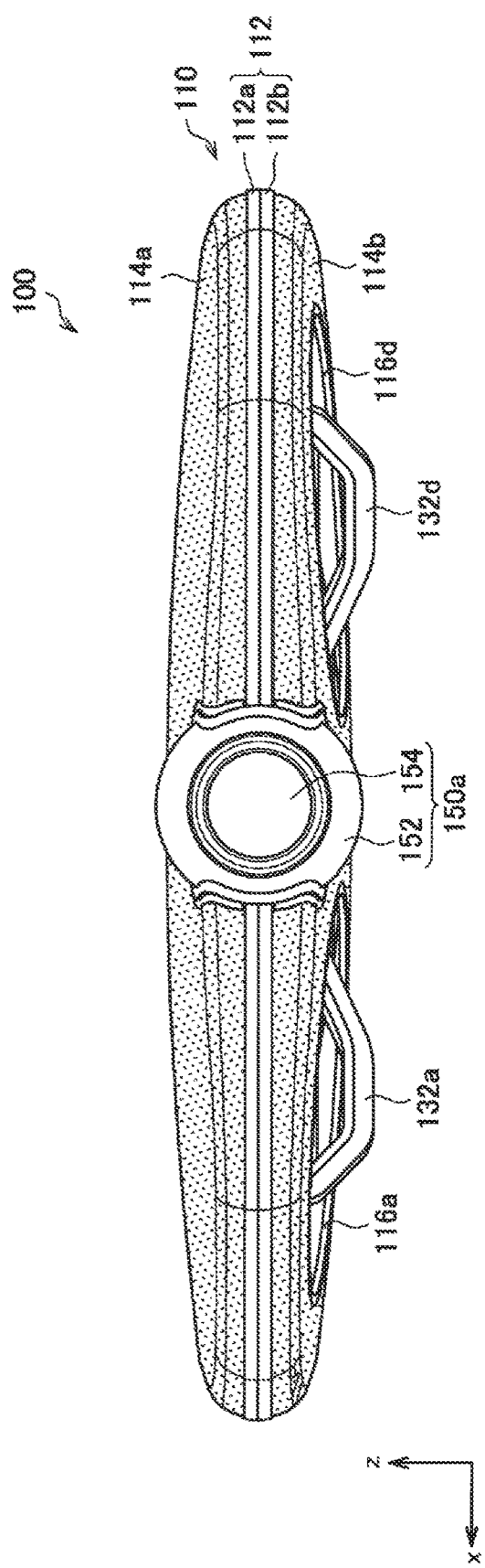
FIG. 5 is a front view of the flying device according to the embodiment.
Figure 6:
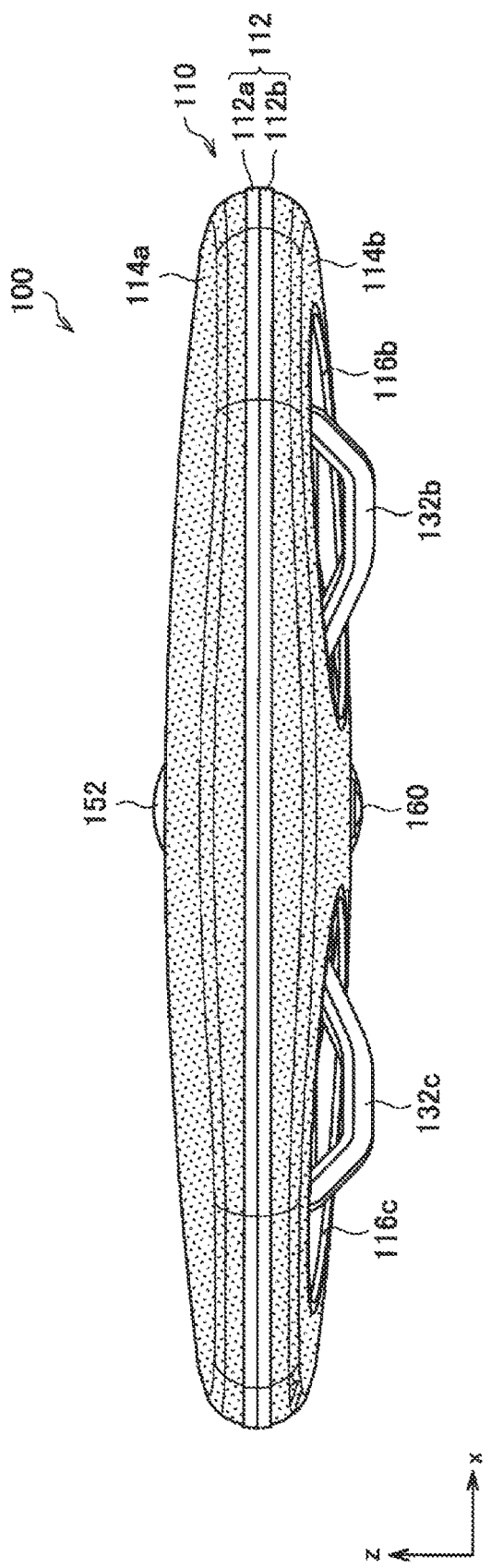
FIG. 6 is a back view of the flying device according to the embodiment.
Figure 7:
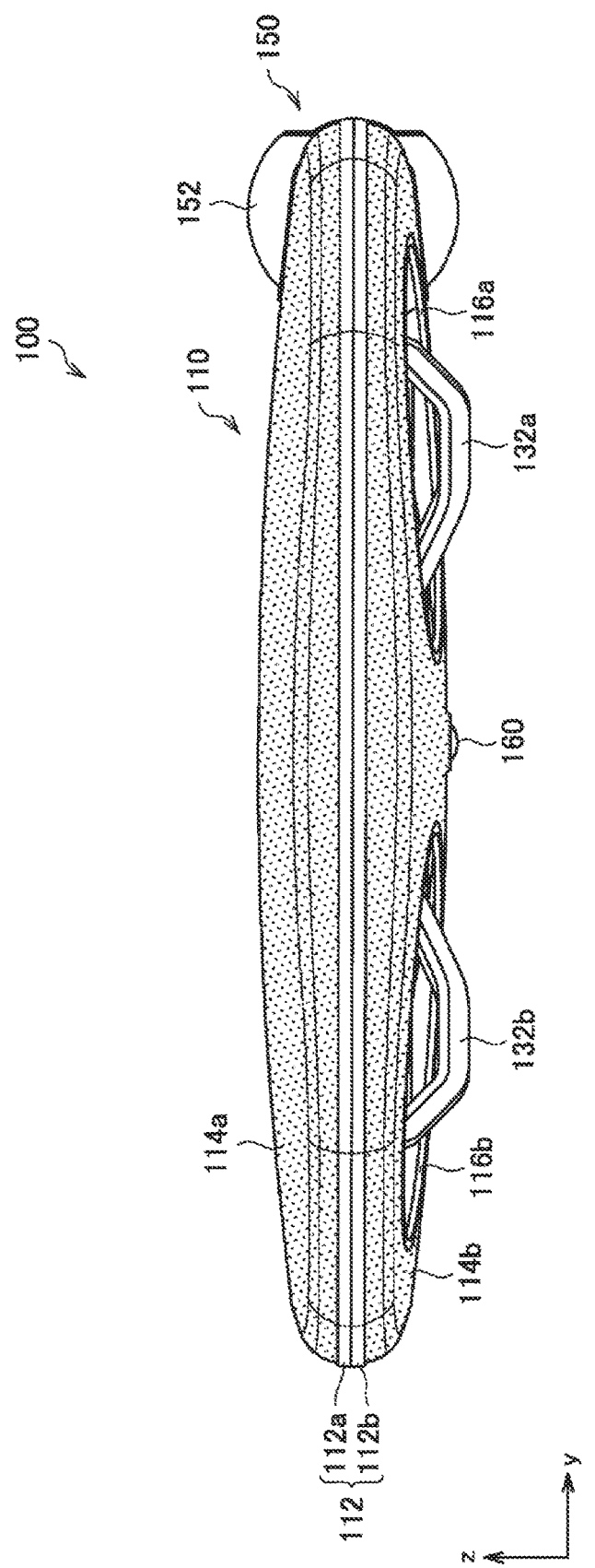
FIG. 7 is a left side view of the flying device according to the embodiment.
Figure 8:
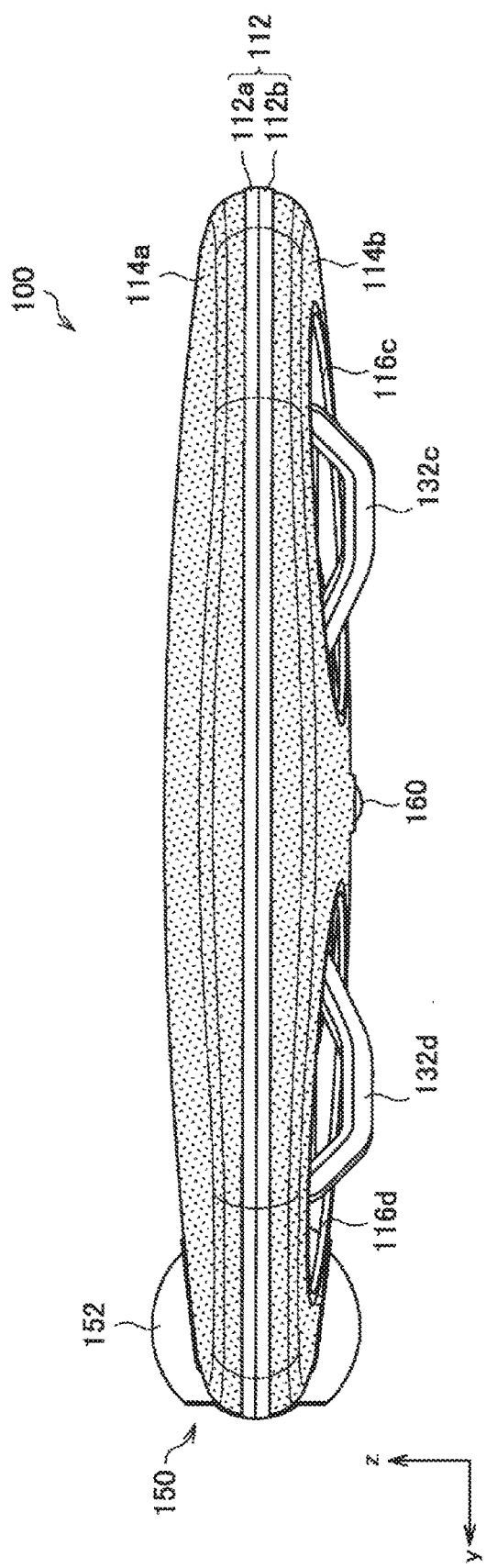
FIG. 8 is a right side view of the flying device according to the embodiment.

First, based on FIGS. 2 to 8, an external configuration of the flying device 100 according to the present embodiment will be described. Note that, FIG. 2 is a perspective view of the flying device 100 according to the present embodiment. FIG. 3 is a plan view of the flying device 100 according to the present embodiment. FIG. 4 is a bottom view of the flying device 100 according to the present embodiment. FIG. 5 is a front view of the flying device 100 according to the present embodiment. FIG. 6 is a back view of the flying device 100 according to the present embodiment. FIG. 7 is a left side view of the flying device 100 according to the present embodiment. FIG. 8 is a right side view of the flying device 100 according to the present embodiment.

As shown in FIG. 2, the flying device 100 includes a main body 110 including a flying mechanism and an image-capturing part 150. The main body 110 refers to portions of components necessary for flight, other than the image-capturing part 150. A side provided with the image-capturing part 150 of the flying device 100 is defined as the front surface. Moreover, as shown in FIG. 2, it will be described below with x-direction defined as the transversal direction, y-direction as the longitudinal direction, and z-direction as the height direction.

As shown in FIG. 2, the flying device 100 according to the present embodiment has a substantially square shaped appearance having a thickness in the height direction and is in a round shape as a whole. As shown in FIGS. 3 and 4, the main body 110 is in a substantially rectangular shape as viewed in the plan view, and its four corners are in an elliptic arc with the corners eliminated. Portions corresponding to the sides of the substantially square shape are depressed in the central portions of the sides toward the center of the main body 110. Such an outer shape of the main body 110 is formed by a frame 112 and a mesh material 114 attached to the frame 112.

(Frame)

The frame 112 is a member defining the plan view outer shape of the flying device 100 and made of, for example, resin or the like. The frame 112 may be configured to overlap a first frame 112a and a second frame 112b of the same shape, for example. The first frame 112a is on the upper side of the flying device 100, and supports a first mesh material 114a. The second frame 112b is on the lower side of the flying device 100, and supports a second mesh material 114b. Thus, the frame 112 includes two members, enabling to sandwich the mechanism, which is provided inside the flying device 100, from above and below and cover it. Of course, the frame 112 may not be configured to be separable into two members, but may be configured from one member.

Moreover, as described below, the frame 112 is connected to members that support the flying mechanism, etc., inside the flying device 100 by frame connecting members. The details of such a configuration will be described below.

(Mesh Material)

The mesh material 114 is a covering member to cover various mechanisms provided inside the flying device 100. The main body 110 includes therein flying mechanisms such as propellers and motors to rotate and drive the propellers, a control part to perform flying control of the flying device 100 and shooting control of the image-capturing part 150, and batteries, etc. The mesh material 114 is provided to cover mechanisms for causing the flying device 100 to function. The mesh material 114 includes a first mesh material 114a to cover the upper side of the flying device 100 and a second mesh material 114b to cover the lower side of the flying device 100.

As shown in FIG. 3, the first mesh material 114 is provided to cover the whole upper faces of various mechanisms provided inside. As shown in FIG. 5, etc., the first mesh material 114a is formed in a round shape so as to protrude toward above the first frame 112a.

On the other side, as shown in FIG. 4, the second mesh material 114b is provided to cover the lower faces of the various mechanisms provided inside. As shown in FIG. 5, etc., the second mesh material 114b is formed in a round shape so as to protrude toward below the second frame 112b. In this case, portions corresponding to the propellers 145a to 145d are not covered with the second mesh material 114b, but are openings 116a to 116d. In such a manner, the openings 116a to 116d are provided to improve air permeability of the lower face side of each of the propellers, and thus flying performance can be enhanced. Note that, in the second mesh material 114b, an opening 118 is provided also in the position corresponding to a spatial recognition camera 160 that is provided on the bottom face side of the main body 110.

As shown in FIGS. 4 to 8, legs 132a to 132d are protruded from the openings 116a to 116d. The legs 132a to 132 protruded outward more than the second mesh material 114b are provided so that the legs 132a to 132d contact on the ground when the flying device 100 lands, and thus damages to the motors 142a to 142d, the spatial recognition camera 160, etc., can be prevented. Detailed configuration of the legs 132a to 132d will be described below.

Note that the flying device 100 according to the present disclosure does not necessarily have to include the openings 116a to 116d in the portions corresponding to the propellers 145a to 145d, but the whole lower face may be covered with the mesh material, similar to the upper face side of the flying device 100.

In the present embodiment, the mesh material 114 is used as the member to cover various mechanisms provided inside the flying device 100. The mesh material 114 is a sheet-like member of mesh structure with a plurality of small holes having air permeability. Using the mesh material 114 makes it possible to realize a weight reduction of the flying device 100 and enhanced flying performance. In this case, from the viewpoint of safety, the hole size of the mesh material 114 may be small enough that user's fingers cannot pass through so that the user may not directly touch various mechanisms of the flying device 100.

The mesh material 114 may employ a soft and elastic sheet-like member that is formed, for example, by interweaving chemical fibers. This elasticity means that when an external force is applied to the mesh material 114, the mesh material 114 deforms according to the external force, and when the external force is removed, a shape of the mesh material 114 returns to the original shape. Accordingly, even if portions of the mesh material 114 are bent when gripped by a user with the hand, a shape of the mesh material 114 returns to the original shape when released from the user's hand. The elasticity of the mesh material 114 can, even if the flying device 100 receives an impact from outside, not only absorb the impact and prevent various mechanisms in the flying device 100 from being damaged, but also allow returning to the original shape without spoiling the appearance. Furthermore, by using the mesh material 114 formed with a plurality of holes, it is possible to attain weight reduction.

In such a manner, the mechanism for causing the flying device 102 to function is covered with the mesh material 114 so that the user can hold the flying device 100 without directly touching the flying mechanisms, etc. Moreover, due to the small exposed parts of the flying mechanism, a user can readily perform, for example, also storing the flying device 100 as it is in a bag, etc. Furthermore, also in the flight of the flying device 100, the flying mechanism is covered with a mesh member, and thus it is possible to prevent, for example, foreign materials from making contact with the propellers and hindering a stable flight.

Note that, in the present embodiment, as the covering member, the mesh material 114 made of chemical fibers has been used, but the present disclosure is not limited to such an example. For example, the covering member may employ metal materials, plastic materials, wire nets or the like having a plurality of holes.

(Image-Capturing Part)

An image-capturing part 150 is an image-capturing device which shoots a subject to capture a still image or moving image. The flying device 100 including the image-capturing part 150 can perform shooting in flight. The image-capturing part 150 includes an image-capturing unit 150*a* including an imaging element (not shown) and a lens part 154, etc., which are held by a holding part 152, and an imaging control unit to control the image-capturing unit 150*a*. The imaging element may employ, for example, a charge coupled device (CCD) image sensor, a complementary metal oxide semiconductor (CMOS) image sensor or the like.

For example, as shown in FIG. 2, the image-capturing unit 150*a* is provided outside the main body 110. As shown in FIGS. 3, 4, 7, and 8, etc., the image-capturing unit 150*a* is disposed on a depressed portion of the frame 112, and a lens part 154 is provided so as not to protrude outward from the frame 112. Hence, for example, even if the flying device 100 contacts a wall, wood, the ground, etc., the possibility that the lens part 154 directly contacts these is lowered and the possibility of the damage of the image-capturing unit 150*a* can be reduced.

The holding part 152 of the image-capturing unit 150*a* is rotatably supported by a supporting part 126 and provided so that a shooting direction can be changed. In this case, forming the holding part 152 into a spherical shape allows the image-capturing unit 150*a* to easily move vertically and horizontally. For example, the image-capturing unit 150*a* may be provided so as to be movable 90° upward, 90° downward, 45° leftward, and 45° rightward, based on the state oriented in the y-axis positive direction. This can extend the shooting-capable range and expand variation of shooting. Note that, when the image-capturing unit 150*a* is moved horizontally, the frame 112, the mesh material 114, etc., may be included in the shooting range. Accordingly, the movable range of the image-capturing unit 150*a* in the horizontal direction may be set according to an installation position to the main body 110 so that the frame 112, the mesh material 114, etc., are not included in the shooting range.

On the other hand, the imaging control unit (not shown) includes semiconductor chips, etc., such as microcomputers and is provided inside the main body 110. The imaging control unit may be provided in a center guard 121 provided in the central portion of the main body 110, for example, so as to be surrounded by rotor guards 122*a* to 122*d* that surround the outer perimeter of the four propellers 145*a* to 145*d*. In such a manner, the imaging control unit is provided inside the main body 110, and thus the imaging control unit can be protected from impacts, etc., against the flying device 100 and the damage can be prevented.

Note that, in the flying device 100 according to the present embodiment, on the center of the bottom face side of the main body 110, the spatial recognition camera 160 is provided. To capture an image of a subject properly with the image-capturing part 150, it is desirable to, in addition to control of the flying mechanism as described below, know a self position in environment or a relative position with respective to an imaging object. The spatial recognition camera 160 is provided, and thus feature points and objects in environment can be recognized by simultaneous localization and mapping (SLAM), etc., and its own position can be estimated from moving amounts of a plurality of target points.

Other than this, the environment recognition can be performed using, for example, acceleration sensors, gyro sensors or other inertial sensors. For example, by measuring acceleration and angular velocity of an own device using inertial sensors such as acceleration sensors or a gyro sensors, a current position and attitude can be found from amounts of change in positions and attitudes. Furthermore, by measuring absolute magnitudes such as bearings and altitudes with a barometric sensor or the like, it is possible to find a position and attitude of the own device while correcting errors caused by integrating the amounts of change described above.

[2.2. Internal Configuration]

Figure 9:
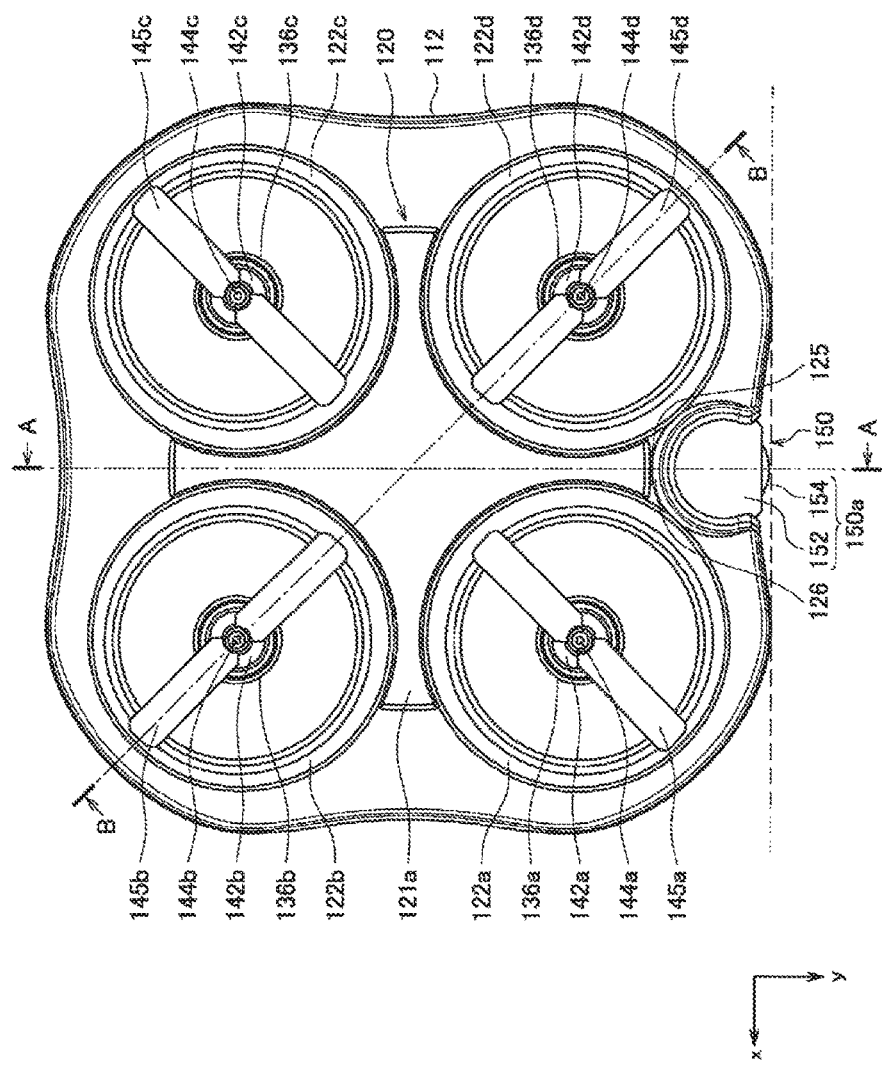
FIG. 9 is a plan view of the flying device according to the embodiment, and shows a state in which a mesh material is removed from the state of FIG. 3.
Figure 10:
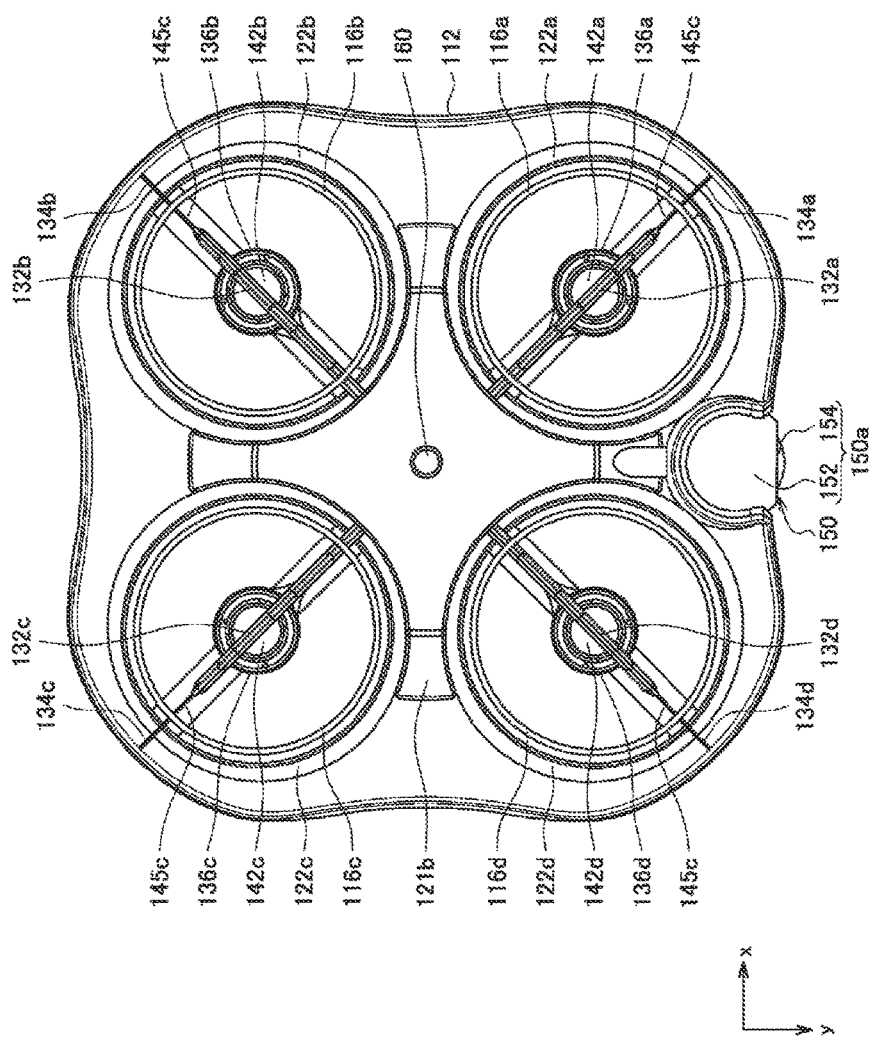
FIG. 10 is a bottom view of the flying device according to the embodiment, and shows a state in which a mesh material is removed from the state of FIG. 4.
Figure 11:
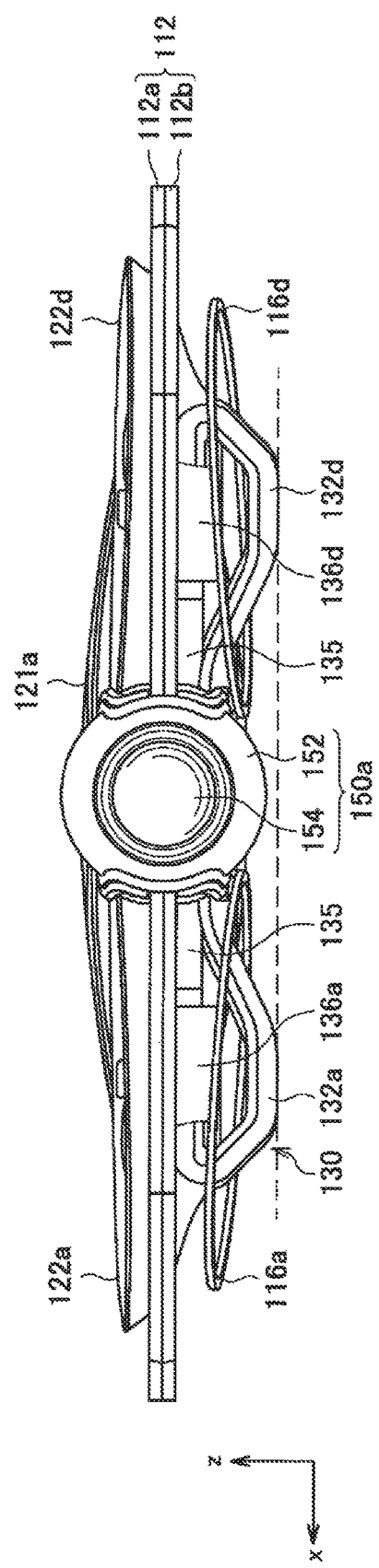
FIG. 11 is a front view of the flying device according to the embodiment, and shows a state in which a mesh material is removed from the state of FIG. 5.
Figure 12:
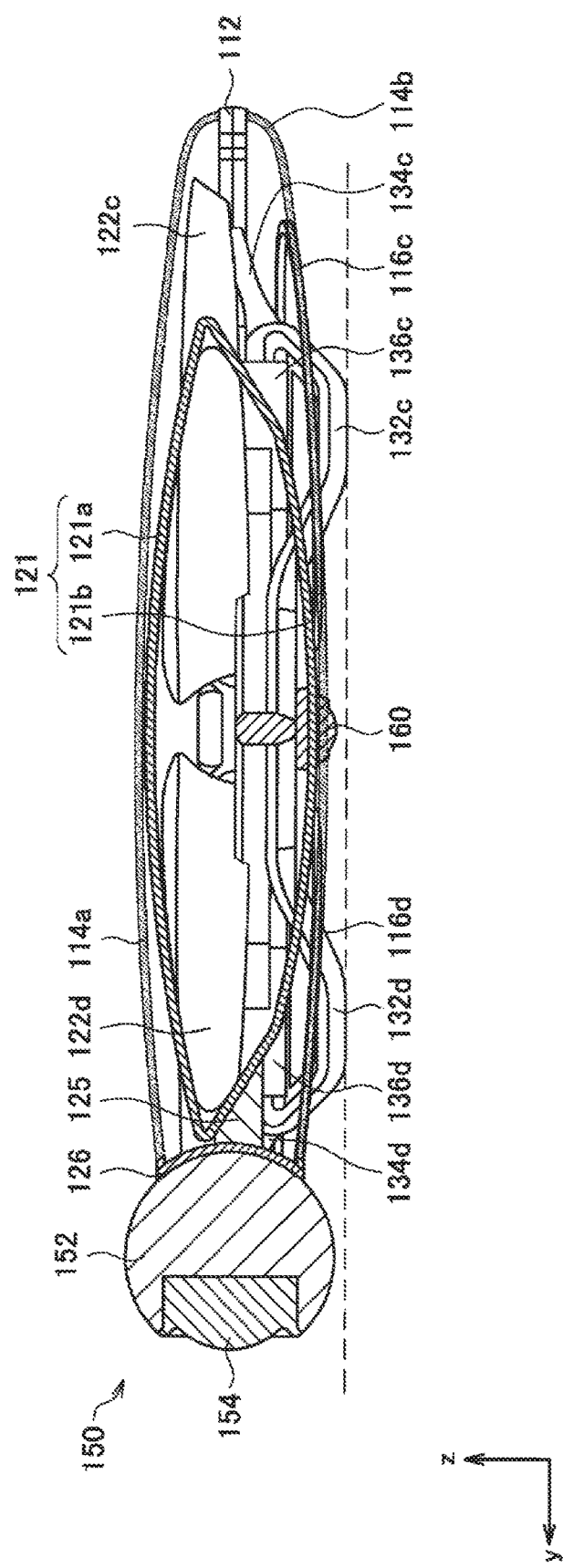
FIG. 12 is a cross-sectional view in an A-A cutting line of FIG. 9.
Figure 13:
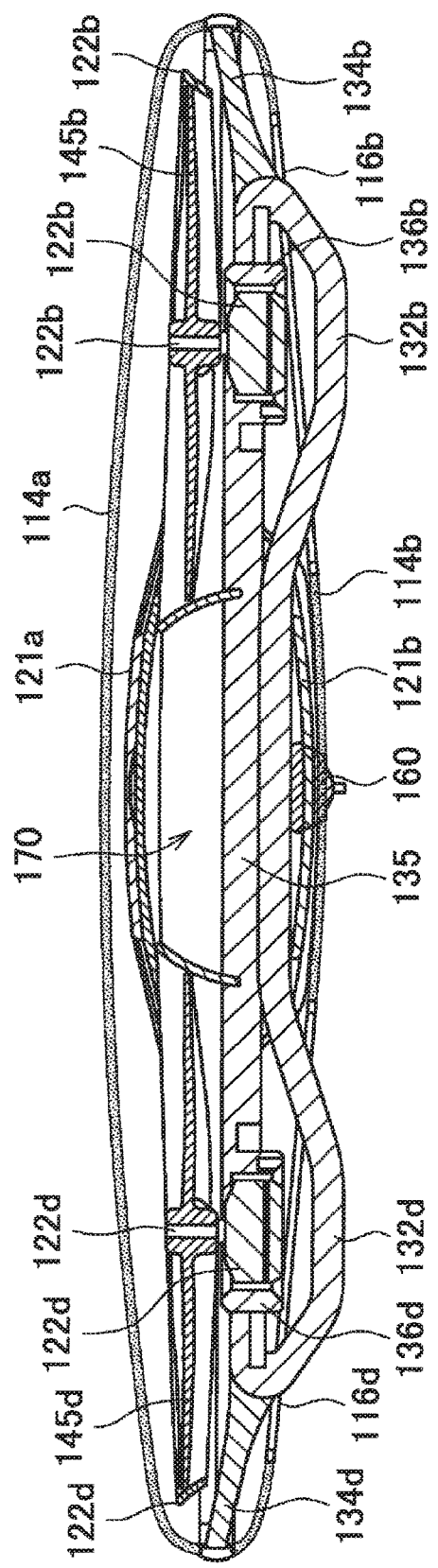
FIG. 13 is a cross-sectional view in a B-B cutting line of FIG. 9.

Next, based on FIGS. 9 to 13, an internal configuration of the flying device 100 according to the present embodiment will be described. FIG. 9 is a plan view of the flying device 100 according to the present embodiment and shows a state in which the mesh material 114 is removed from the state of FIG. 3. FIG. 10 is a bottom view of the flying device 100 according to the present embodiment, and shows a state in which the mesh material 114 is removed from the state of FIG. 4. FIG. 11 is a front view of the flying device 100 according to the present embodiment, and shows a state in which the mesh material 114 is removed from the state of FIG. 5. FIG. 12 is a cross-sectional view in an A-A cutting line of FIG. 9. FIG. 13 is a cross-sectional view in a B-B cutting line of FIG. 9.

As shown in FIG. 10, inside the main body 110 of the flying device 100, flying mechanisms necessary for flight, guard mechanisms to protect the flying mechanism, etc., and internal frames to hold the structure of the flying device 100 from the inside are provided.

(Flying Mechanism)

In the flying device 100 according to the present embodiment, the flying mechanism includes four propellers 145a to 145d and motors 142a to 142d to respectively rotate and drive the respective propellers 145a to 145d. The propellers 145a to 145d are provided on the rotation shafts 144a to 144d of the motors 142a to 142d and are rotated with the rotations of the rotation shafts 144a to 144d. As shown in FIG. 10, the four propellers are disposed so as to correspond to the four corners of the main body 110 as viewed in the plan view.

In the flying device 100, the rotation speeds of the propellers 145a to 145d can be controlled by the respective motors 142a to 142d independently, and thus the operations such as floating, moving, stopping, and landing, are possible. For example, when the rotation speeds of all the propellers 145a to 145d are synchronized, the propellers 145a and 145c are rotated in the same direction, and the propellers 145b and 145d are rotated in the opposite direction to the propellers 145a and 145c, the flying device 100 can be raised and lowered.

Moreover, for example, in a state where the flying device 100 is floating, when the rotation speeds of the propellers 145a and 145b are decreased compared with the rotation speeds of the propellers 145c and 145d, the flying device 100 moves toward the direction of the propeller 145a and 145b in the state of floating. Furthermore, for example, in a state where the flying device 100 is floating, when the rotation speed of the propellers 145a and 145c are decreased compared with the rotation speed of the propellers 145b and 145d, the flying device 100 horizontally rotates clockwise or counterclockwise in the state of floating.

In such a manner, in the flying device 100, by properly changing the rotation speed of the propellers 145a to 145d, the operations such as floating, horizontally moving, turning, stopping, and landing are made possible. Note that, in the present embodiment, the number of propellers has been four, but the present disclosure is not limited to such an example, and the number of propellers may be either one or more. In this case, the number of propellers is an even number equal to or more than four and the pair of propellers are made identical in configuration with each other, and thus a stable flight can be realized.

(Guard Mechanism)

The guard mechanism includes the rotor guards 122a to 122d to protect the respective propellers 145a to 145d of the flying mechanism, and the center guard 121 provided on the central portion of the main body 110. The rotor guards 122a to 122d and the center guard 121 are formed of, for example, resin or the like.

As shown in FIG. 9, the rotor guards 122a to 122d are annular members provided to surround the rotation range of the propellers 145a to 145d. The rotor guards 122a to 122d have a height in the height direction (z-direction) so as to cover the height range of the propellers in consideration of also the inclined range of the surface of the propellers 145a to 145d. The rotor guards 122a to 122d can protect the propellers 145a to 145d from impacts from the horizontal direction of the flying device 100.

The center guard 121 is provided so as to be located at the central portion of the flying device 100 in an inner space covered with and in the mesh material 114 and is provided so as to join the four rotor guards 122a to 122d, respectively. The inner space covered with the center guard 121 houses, for example, the imaging control unit, drive parts to drive and control motors 142a to 142d, batteries, etc. Hence, the control part, batteries, etc., can be protected from impacts against the flying device 100. Moreover, on the center guard 121 of the bottom face side, the spatial recognition camera 160 is provided.

Furthermore, as shown in FIG. 12, the front face side of the center guard 121 is connected by the connecting member 125 to the supporting part 126 that rotatably supports the holding part 152 of the image-capturing part 150. Hence, the supporting part 126 is supported by the frame 112 on both ends thereof and supported by the center guard 121 from the back side thereof via the connecting member 125, and thus the supporting part 126 can hold a stable state.

(Internal Frame)

The internal frame is a member provided for holding the structure of the flying device 100, and includes the legs 132a to 132d, frame connecting members 134a to 134d, a central frame 135, and motor holding parts 136a to 136d.

The legs 132a to 132d are portions which contact the ground when the flying device 100 lands. As shown in FIG. 10, the legs 132a to 132d are provided so as to pass below the motors 142a to 142d along the diagonal lines of the main body 110. The legs 132a to 132d are provided corresponding to the motors 142a to 142d, and thus the flying mechanism, such as the motors 142a to 142d and propellers 145a to 145d, can be configured so as to be unlikely to be touched by a user. Note that the legs 132a to 132d according to the present embodiment are formed integrally with the central frame 135, but the present disclosure is not limited to such an example, and may be configured to be separable from the central frame 135.

As shown in FIG. 12, the legs 132a to 132d according to the present embodiment are formed such that portions protruded from the openings 116a to 116d are gently bent to form an obtuse angle. Hence, even if the legs 132a to 132d are touched by a user, these do not hurt and safety in using the flying device can be enhanced. Moreover, the legs 132a to 132d are formed to protrude more than the spatial recognition camera 160 in the height direction (z-direction). Hence, when the flying device 100 lands, the legs 132a to 132d contact the ground before the spatial recognition camera 160 does, thus preventing the spatial recognition camera 160 from contacting the ground and being damaged.

Note that the legs 132a to 132d do not have to be in a gently bent shape as shown in FIG. 13, and may be members protruding toward the bottom face side of the flying device 100. The legs 132a to 132d are formed of, for example, resin or the like. The legs are formed of resin, and thus can readily absorb impacts at the time of landing and can be easily exchanged when the legs 132a to 132d are damaged.

The frame connecting members 134a to 134d are members connecting the frame 112, the legs 132a to 132d and the central frame 135. As shown in FIG. 10, the frame connecting members 134a to 134d are provided along the diagonal lines, similar to the legs 132a to 132d. The frame connecting members 134a to 134d are made of elastic members and made of, for example, flexible plastic materials or the like. By forming the frame connecting members 134a to 134d to have elasticity like this, impacts from the frame 112 or legs 132a to 134d can be absorbed.

As shown in FIG. 13, the central frame 135 is a supporting member provided on a substantially central portion of the main body 110. That is, the central frame 135 is provided at the substantially center of the flying device 100 as viewed from the plan view, and is provided at the substantially center also in the height direction. The central frame 135 is formed of a member having strength and less likely to positionally deform or thermally deform, such as metal or carbon, for example. The central frame 135 is connected to the frame 112 by the elastic frame connecting members 134a to 134d. Moreover, as shown in FIG. 13, the central frame 135 forms a space 170 with the center guard 121 provided on the central portion of the flying device 100. In the space 170 formed by the central frame 135 and the center guard 121, the imaging control unit, the control part to drive and control the motors 142a to 142d, the batteries, etc., are disposed. Note that, in the present embodiment, the central frame 135 and the center guard 121 are separate members, but this technology is not limited to such an example, and the central frame 135 and the center guard 121 may be formed integrally.

The motor holding parts 136a to 136d are members to hold the motors 142a to 142d, and are supported by the central frame 135. That is, the motors 142a to 142d are supported by the central frame 142 via the motor holding parts 136a to 136d.

In such a manner, the internal frame protects the flying mechanism, the imaging control unit, etc., which are provided inside the main body 110 from impacts while holding the configuration of the flying device 100.

As described above, each mechanism provided in the main body 110 of the flying device 100 is covered with the mesh material 114. Accordingly, as shown in FIG. 2, the flying mechanism, etc., can be recognized via the mesh material 114, but these are configured so as to be unlikely to be directly touched by a user from the outside of the flying device 100. Hence, the flying device 100 having high safety can be configured. Moreover, the frame 112, legs 132a to 132d and central frame 135 of the flying device 100 are connected by the elastic frame connecting members 134a to 134d, and thus impacts from the outside can be absorbed by the frame connecting members 134a to 134d. Hence, the damage of components can be reduced and also the damage of objects which the flying device 100 contacts can be reduced.

3. Conclusion

As above, the configuration of the flying device 100 according to the present embodiment has been described. In the flying device 100 according to the present embodiment, the flying mechanism necessary for flying, such as propellers 145a to 145d and motors 142a to 142d, are covered with the mesh material 114. Hence, the flying mechanism can be configured so as to be unlikely to be directly touched by a user, and the safety in using the flying device can be enhanced. Moreover, the flying mechanism is covered with soft material like the mesh material 114, and thus, even if the flying device 100 contacts human or objects, the possibility to damage these can be reduced and the safety can be further enhanced. Furthermore, also by eliminating corner portions of the frame 112 and the legs 132a to 132d to form the round shape, the safety can be enhanced.

Moreover, the frame 112, the legs 132a to 132d, and the central frame 135 are connected by the elastic frame connecting members 134a to 134d, and thus impacts from the frame 112 and the legs 132a to 132d can be absorbed by the frame connecting members 134a to 134d. As described above, with a configuration in which impacts from the outside are less likely to be transmitted to the imaging control unit, the control part of the motor and the batteries which are provided in the main body 110, and the holding part 152, etc., supported by the frame 112, etc., via the supporting part 126, it is possible to reduce the damage of the components.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, the present technology that the planar shape of the flying device 100 is in a substantially rectangular shape close to a square is not limited to such an example. The outer shape of the flying device 100 is not limited in particular, and the planar shape may be optionally set, for example, a circle, an ellipse, a polygonal or the like.

Moreover, in the above-described embodiment, the flying device 100 includes the image-capturing part 150, but the present disclosure is not limited to such an example, and the flying device 100 does not necessarily have to include the image-capturing part 150. As a use of such a flying device 100, it is considered to, for example, cause it to perform air attractions or the like. The safety may be required also for such a flying device 100 and use of the flying device 100 according to the above-described embodiment allows it to fly safely.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A flying device including:
a flying mechanism; and
a covering member which is supported by a frame surrounding the flying mechanism and covers at least a portion of the flying mechanism.

(2)

The flying device according to (1), wherein
the covering member is made of a sheet-like member which deforms according to an external force and is restored in shape when the external force is removed.

(3)

The flying device according to (1) or (2), wherein
the covering member is made of a sheet-like member having a mesh structure.

(4)

The flying device according to any one of (1) to (3), wherein
the flying mechanism includes a propeller and a drive part to rotatably drive the propeller, and
the covering member covers at least an upper face side of the propeller.

(5)

The flying device according to (4), wherein
the covering member covering a lower face side of the propeller is open at a position corresponding to the propeller.

(6)

The flying device according to (5) including:
a leg protruded from an opening of the covering member.

(7)

The flying device according to (6), wherein the leg and the frame are connected by a frame connecting member having elasticity.

(8)

The flying device according to any one of (1) to (7), wherein a central frame provided at a central portion of the flying device and the frame are connected by a frame connecting member having elasticity.

(9)

The flying device according to (8), wherein a center guard to cover the central portion of the flying device is provided in an inner space covered by the covering member, and a control part to drive the flying mechanism is stored in a space formed by the central frame and the center guard.

(10)

The flying device according to any one of (1) to (8), further including:

an image-capturing device that includes an image-capturing unit to capture an image of a subject and an imaging control unit to control the image-capturing unit, wherein at least the image-capturing unit is disposed so as not to be covered by the covering member.

(11)

The flying device according to (10), wherein the image-capturing unit is in a spherical shape and is rotatably provided to the frame.

(12)

The flying device according to (11), wherein the frame is formed to protrude more than the image-capturing unit.

(13)

An image-capturing device including:

a flying mechanism;

a covering member which is supported by a frame surrounding the flying mechanism and covers at least a portion of the flying mechanism; and an image-capturing part to capture an image of a subject.

(14)

The image-capturing device according to (13), wherein the image-capturing part includes an image-capturing unit and an imaging control unit to control the image-capturing unit, and at least the image-capturing unit is disposed so as not to be covered by the covering member.

(15)

The image-capturing device according to (14), wherein the image-capturing unit is in a spherical shape and is rotatably provided to the frame.

(16)

The image-capturing device according to (15), wherein the frame is formed to protrude more than the image-capturing unit.

REFERENCE SIGNS LIST 100 flying device
110 main body
112 frame
114 mesh material
121 center guard
122a-122d rotor guard
132a-132d leg
134a-134d frame connecting member
135 central frame
136a-136d motor holding part
142a-142d motor
144a-144d rotation shaft
145a-145d propeller
150 image-capturing part
150a image-capturing unit
152 holding part
154 lens part
160 spatial recognition camera
170 space

The invention claimed is:

1. A flying device, comprising:
a flying mechanism that includes:
a propeller; and
a drive part configured to rotatably drive the propeller;
a frame that surrounds the flying mechanism; and
a covering member that covers at least an upper face side of the propeller and a lower face side of the propeller, wherein
the covering member is open at a position that corresponds to the lower face side of the propeller, and
the frame supports the covering member.

2. The flying device according to claim 1, wherein
the covering member is a sheet-like member,
the sheet-like member is configured to be deformed based on application of an external force, and
the deformed sheet-like member is configured to be restored in a specific shape based on removal of the applied external force.

3. The flying device according to claim 1, wherein the covering member is a sheet-like member having a mesh structure.

4. The flying device according to claim 1, further comprising a leg protruded from an opening of the covering member.

5. The flying device according to claim 4, further comprising a frame connecting member having elasticity,
wherein the leg and the frame are connected by the frame connecting member.

6. The flying device according to claim 1, further comprising:
a central frame at a central portion of the flying device; and
a frame connecting member having elasticity,
wherein the central frame and the frame are connected by the frame connecting member.

7. The flying device according to claim 6, further comprising:
a center guard in an inner space of the flying device, wherein
the center guard covers the central portion of the flying device, and
the covering member covers the inner space of the flying device; and
a control part configured to drive the flying mechanism, wherein the control part is in a space between the central frame and the center guard.

8. The flying device according to claim 1, further comprising:
an image-capturing device that includes:
an image-capturing unit configured to capture an image of a subject; and
an imaging control unit configured to control the image-capturing unit.

9. The flying device according to claim 8, wherein
the image-capturing unit is in a spherical shape, and
the image-capturing unit is rotatably connected to the frame.

10. The flying device according to claim 9, wherein the frame protrudes more than the image-capturing unit.

11. An image-capturing device, comprising:
a flying mechanism;
a frame that surrounds the flying mechanism;
a covering member that covers at least a portion of the flying mechanism, wherein the frame supports the covering member; and
an image-capturing part configured to capture an image of a subject, wherein
the image-capturing part includes:
an image-capturing unit; and
an image control unit configured to control the image-capturing unit,
the image-capturing unit is in a spherical shape,
the image-capturing unit is rotatably connected to the frame, and
the frame protrudes more than the image-capturing unit.

12. A flying device, comprising:
a flying mechanism;
a frame that surrounds the flying mechanism;
a frame connecting member having elasticity;
a central frame at a central portion of the flying device, wherein the central frame and the frame are connected by the frame connecting member; and
a covering member that covers at least a portion of the flying mechanism, wherein the frame supports the covering member.

13. The flying device according to claim 12, further comprising:
a center guard in an inner space of the flying device, wherein
the center guard covers the central portion of the flying device, and
the covering member covers the inner space of the flying device; and
a control part configured to drive the flying mechanism, wherein the control part is in a space between the central frame and the center guard.

14. The flying device according to claim 12, wherein
the covering member is a sheet-like member,
the sheet-like member is configured to be deformed based on application of an external force, and
the deformed sheet-like member is configured to be restored in a specific shape based on removal of the applied external force.

15. The flying device according to claim 12, wherein the covering member is a sheet-like member having a mesh structure.

16. The flying device according to claim 12, wherein
the flying mechanism includes:
a propeller; and
a drive part configured to rotatably drive the propeller, and
the covering member covers an upper face side of the propeller.

17. The flying device according to claim 12, further comprising a leg protruded from an opening of the covering member.

18. The flying device according to claim 17, wherein the leg and the frame are connected by the frame connecting member.

19. A flying device, comprising:
a flying mechanism;
a frame that surrounds the flying mechanism;
a covering member that covers at least a portion of the flying mechanism,
wherein the frame supports the covering member; and
an image-capturing device that includes:
an image-capturing unit configured to capture an image of a subject; and
an imaging control unit configured to control the image-capturing unit, wherein
the image-capturing unit is in a spherical shape,
the image-capturing unit is rotatably connected to the frame, and
image capturing unit protrudes more than the image-capturing unit.

* * * * *